United States Patent
Blair et al.

(10) Patent No.: US 7,149,412 B2
(45) Date of Patent: Dec. 12, 2006

(54) TRICK MODE AUDIO PLAYBACK

(75) Inventors: Ronald Lynn Blair, Carmel, IN (US); Mark Alan Schultz, Carmel, IN (US); Robert Warren Schmidt, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1077 days.

(21) Appl. No.: 10/086,650

(22) Filed: Mar. 1, 2002

(65) Prior Publication Data

US 2003/0165325 A1 Sep. 4, 2003

(51) Int. Cl.
*H04N 5/91* (2006.01)

(52) U.S. Cl. .................................................. 386/75

(58) Field of Classification Search ................ None
See application file for complete search history.

(56) References Cited

U.S. PATENT DOCUMENTS

| | | | |
|---|---|---|---|
| 4,376,874 A * | 3/1983 | Karban et al. ............. 704/215 |
| 5,687,275 A * | 11/1997 | Lane et al. ................. 386/68 |
| 5,809,454 A | 9/1998 | Okada et al. |
| 5,828,994 A | 10/1998 | Covell et al. |
| 5,893,062 A * | 4/1999 | Bhadkamkar et al. ...... 704/270 |
| 6,049,766 A | 4/2000 | Laroche |
| 6,154,603 A * | 11/2000 | Willis et al. ............... 386/125 |
| 6,205,420 B1 | 3/2001 | Takagi et al. |
| 6,353,703 B1 * | 3/2002 | Tatsumi et al. ............. 386/104 |
| 6,356,211 B1 * | 3/2002 | Shimoyoshi et al. ......... 341/50 |
| 6,484,137 B1 | 11/2002 | Taniguchi et al. |

OTHER PUBLICATIONS

Copy of International Search Report dated Jun. 2, 2003.

* cited by examiner

*Primary Examiner*—Thai Tran
*Assistant Examiner*—Heather R. Jones
(74) *Attorney, Agent, or Firm*—Joseph J. Laks; Robert B. Levy; Jorge Tony Villabon

(57) ABSTRACT

A method for playing a digital audio recording at a speed other than 1X, the method comprises retrieving stored digital audio information represented in a plurality of audio frames. A portion of the plurality of audio frames are ranked according to an energy content in the portion of audio frames. Audio frames having least energy content in accordance with the ranking are deleted from the portion of the plurality of audio frames. Remaining ones of the portion of audio frames following deletion are selected to form an audio trick mode playback signal.

19 Claims, 3 Drawing Sheets

FIG. 3A FIG. 3B FIG. 3C FIG. 3D FIG. 3E

TRICK MODE AUDIO PLAYBACK

BACKGROUND OF THE INVENTION

1. Technical Field

The invention concerns improved trick mode playback, and more particularly to improvements in trick mode playback of digital audio content at other than normal speed.

2. Description of the Related Art

Trick mode playback from a DVD can include speedup or slowdown from normal play speed to either search for a specific location on the disc or to look at details of a clip that would be missed at normal speed playback. By convention, normal playback speed can be denoted as 1X. Both audio and video trick modes are possible and both can be found on commercially available DVD players. However, conventional methods for playback of audio at fast or slow speed have proved to be problematic. The advancement of digital signal processors and especially audio digital signal processors that are used in currently available products have created the possibility for more sophisticated real-time processing for improved audio trick modes.

One problem with the use of video trick modes concerns the treatment of audio corresponding to a playback video segment. For example, when a user speeds up or slows down a displayed video segment, the corresponding audio segment that is played back can be distorted. Typically, audio samples in the audio segment can be shifted to higher frequencies during a fast trick mode, and lower frequencies during a slow trick mode. The fast trick modes that increase the playback speed by a factor of between about 1.5 to 3 times as compared to normal playback will tend to cause human speech to sound higher in pitch. This higher pitched audio playback, the chipmunk effect, can be annoying and in many instances may be unintelligible for a listener. Conversely, slow frequency trick modes can produce a low frequency wobble that may be understandable but not aurally pleasing.

In order to obtain the most useful audio playback during video trick modes as described herein, it can also be necessary to consider the nature of the particular trick mode. For example, while it may be possible to utilize various techniques to provide intelligible audio for at a particular trick mode speed, for example 1.5X, such techniques may provide unsatisfactory results at much higher trick mode speeds, for example 6X or 10X. At such high playback speeds, any attempt to play audio content in synchronism with, or at least at a corresponding rate to that of the video programming may result in unintelligible speech due to the rapid rate at which words would need to be delivered.

To avoid hearing various types of audio artifacts that can be produced during trick mode playback, conventional DVD players will often mute the audio during video trick modes. However, this is not an entirely satisfactory solution as the audio may be of interest in such modes. Accordingly, it would be advantageous if a DVD player could playback audio in a manner that overcomes the limitations of the prior art and achieve a desirable and aurally pleasant playback of audio during video trick modes.

SUMMARY OF THE INVENTION

The invention concerns a method for playing audio content for a video presentation at a trick mode playback speed other than 1X. The method can include retrieving from a storage medium such as a hard disk or DVD, information for producing at least a video portion and a corresponding audio portion of the video presentation. The audio portion of the video presentation can include a plurality of audio frames representing audio information. Each or a portion of the audio frames for the video presentation can be ranked according to their audio energy content. An audio trick mode playback signal can be created for the video presentation, which contains selected ones of the portion of audio frames that were ranked according to their energy content. The required trick mode playback speed can be used to determine the quantity of ranked frames that will be selected for trick mode playback.

Subsequent to calculating the energy content of each of the audio frames, a portion of the audio frames can be selectively removed based on a selected video trick mode playback speed. The portion of audio frames to be selectively removed can be based on a percentage or fraction. For example, at a trick mode speed of 3X, approximately 2 in 3 or 66% of the audio frames must be removed. The removal criteria can be based on the calculated average energy content of each audio frame rather than employing a direct, linear arithmetic relationship derived from the selected trick play speed, for example, keeping only every third audio frame. Notably, those frames having the least amount of energy can be removed first until sufficient frames are left to accommodate the required trick mode speed. Generally, the greater the required trick mode speed, the greater the number of frames that will have to be removed. After removal of the frames, the remaining audio frames can be concatenated to create an audio signal for playback in temporal correspondence with the video programming of the selected video trick mode.

The sum of the absolute magnitudes of an instantaneous value representing the voltage for at least one audio frame can be used as an indicator to determine or represent the energy content for at least a portion of the audio frames. Similarly, the sum of the magnitudes of values in frequency bins within a range of frequencies for at least one audio frame can be used to calculate the energy content for at least a portion of the audio frames.

The invention can also provide an apparatus for playing an audio portion of an audio/video presentation during video trick mode playback at a speed greater than 1X. The apparatus can include a storage medium reader for retrieving from a storage medium, information for producing at least a video portion and a corresponding audio portion of the video presentation. The audio portion of the video presentation can include a plurality of audio frames bearing audio information. An audio processor can be configured to rank at least a portion of the plurality of audio frames for the video presentation according to their energy content. The audio processor can be configured to create an audio trick mode playback signal for the video presentation, which can include selected ones of the portion of audio frames based on their rank.

A processing means can be configured to calculate the audio energy content of at least a portion of the audio frames. The processing means can selectively remove a percentage or fractional portion of the portion of audio frames based on a selected video trick mode playback speed, from the audio portion of the video presentation. The processing means can be further configured to remove a percentage portion of the audio frames having the least amount of energy content by rank. Subsequent to removal of the audio frames with the least amount of energy, the processing means can concatenate the remaining audio frames to create the required trick mode playback signal.

The processing means can be configured to calculate the sum of the absolute magnitudes of instantaneous value representing the voltage for at least one frame, which can be used to calculate the energy content for at least a portion of the audio frames. Similarly, the processing means can be configured to calculate the sum to produce an average of the bins selected ie not upper or Lower frame of the magnitudes of signals in certain frequency bins within a range of frequencies for at least one frame, which can be used to calculate the energy content for at least a portion of the audio frames.

The inventive arrangement for increasing replay audio speed can be advantageously employed in digital audio playback sources using for example hard disk or solid sate memory, with encoding such as MP3. Digital audio playback devices can benefit from the inventive arrangements disclosed herein to facilitate reproduction of audio signals at rates higher than the original 1X recorded rate.

BRIEF DESCRIPTION OF THE DRAWINGS

FIG. 3A, depicts exemplary audio frames each of which have been assigned relative values for their energy content in accordance with the present invention.

FIG. 3B depicts exemplary audio frames that have been marked for possible deletion in accordance with the present invention.

FIG. 3C depicts exemplary weights that have been assigned to the groups of frames that have been marked for possible deletion in accordance with the present invention.

FIG. 3D depicts the deletion of frames that have been marked for possible deletion in accordance with the present invention.

FIG. 3E depicts the concatenation of the frames remaining after the frames have been deleted in accordance with the present invention.

DETAILED DESCRIPTION

The present invention can be used for performing playback of audio during video trick modes at speeds greater than 1X in any type of digital video recorded on any suitable storage medium. For convenience, the invention shall be described in the context of a DVD medium utilizing conventional MPEG-1 or MPEG-2 format. However, those skilled in the art will appreciate that the invention is not limited in this regard. The data storage medium can include any media that is capable of storing substantial amounts of audio and video data for retrieval and playback at a subsequent time. As used herein, a storage medium can include, but is not limited to, optical, magnetic and electronic means for storing data. Exemplary digital storage media can include an optical digital versatile disk (DVD), a magnetic hard disk, a magneto optical disk, a video CD or regular CD, or solid-state memory such as dynamic random access memory (DRAM), synchronous DRAM (SDRAM) or other RAM based memory. Furthermore although the inventive arrangements disclosed herein are described in the context of an audio accompaniment to trick mode video playback, these advantageous arrangements are equally applicable to the reproduction of digitally recorded audio signals at rates higher than the original 1X recording rate.

Figure 1:
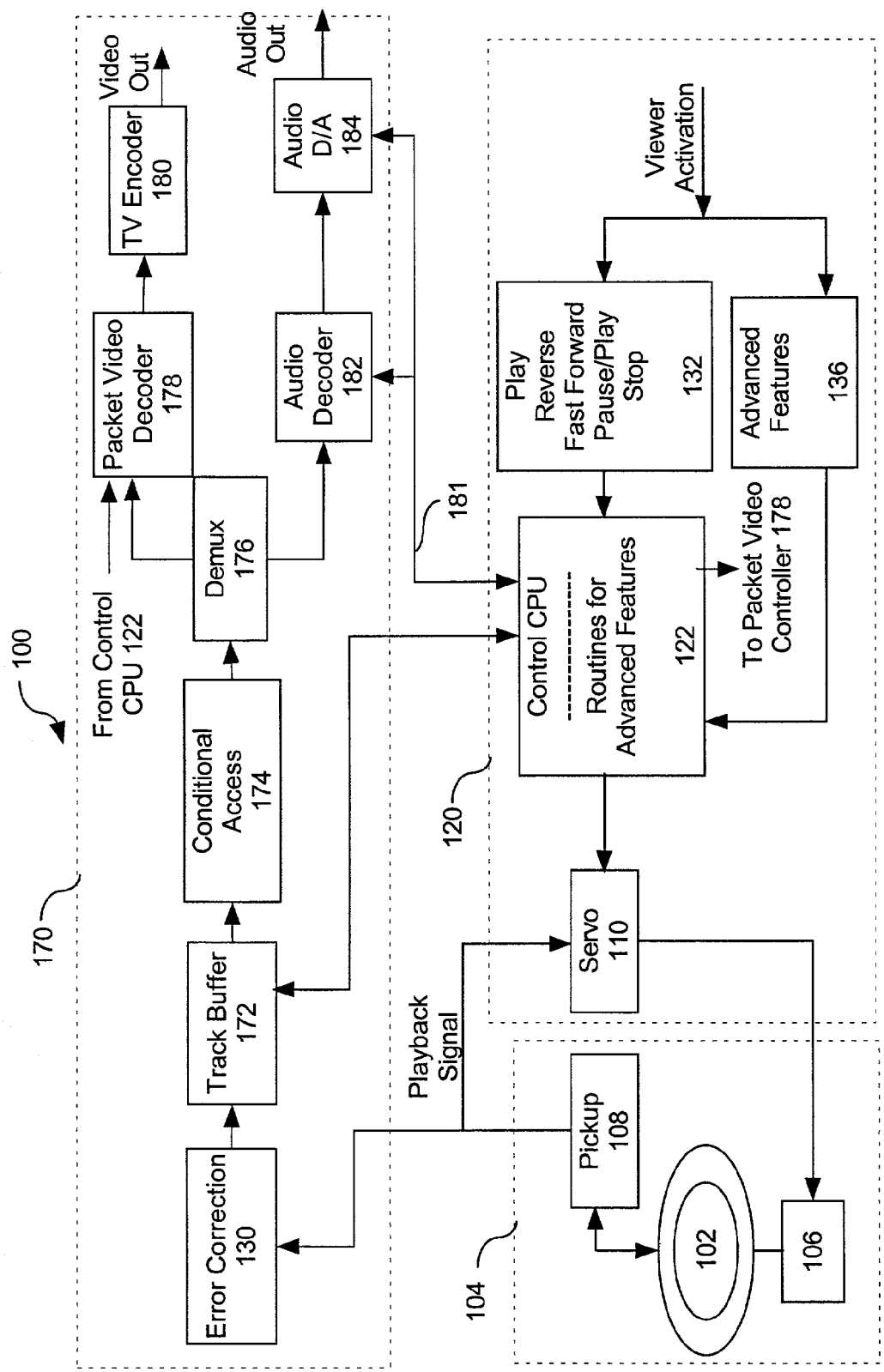
FIG. 1 is a block diagram of a DVD device that can be provided with one or more advanced operating functions in accordance with the inventive arrangements.

FIG. 1 is a block diagram of an exemplary DVD video player in which the present invention may be implemented. The device 100 can have the capability to read stored data from a digital storage medium. Referring to FIG. 1, the storage medium can be a disk medium 102, for example, a re-writable DVD. Device 100 can include a mechanical assembly 104, a control section 120, and a audio/video (A/V) output processing section 170. The allocation of most of the blocks to different sections is self-evident, whereas the allocation of some of the blocks is made for purposes of convenience and is not critical to understanding the operation of the device 100. Importantly, it should be recognized that if the data storage medium were a solid-state device, the mechanical assembly 104 would not be necessary to practice the invention. In this case, the coded digital data stored in the storage medium can be directly accessed by control CPU 122 and buffered in track buffer 172.

Notwithstanding, the mechanical assembly 104 can include a motor 106 for spinning disk 102 and a pickup assembly 108 adapted to be moved over the spinning disk 102. A laser mounted on, or associated with, the pickup assembly 108 can illuminate data already stored onto the disk track for playing back video and/or audio program data. For purposes of understanding the invention, it is irrelevant whether the disc is recordable. The laser associated with the pickup assembly 108 and the motor 106 can be controlled by a servo 110. The servo 110 can also be configured to receive a input playback signal representing data read from spiral tracks on disk 102. The playback signal can also serve as an input to an error correction circuit 130, which can be considered part of the control section 120 or part of the A/V output processing section 170.

The control section 120 can include a control central processing unit (CPU) 122. The servo 110 can also be considered part of the control section 120. Suitable software or firmware can be provided in a memory for the conventional operations performed by control CPU 122. In addition, program routines for the advanced features as described herein can be provided for controlling CPU 122.

A control buffer 132 for viewer activatable functions can be configured to indicate exemplary functions presently available, namely play, reverse, fast forward, slow play, pause/play and stop. The pause function is analogous to pause operation typically found on most videocassette recorders (VCRs). The pause function can have the capability to manually interrupt the play back of a prerecorded presentation in order to eliminate undesired segments such as advertisements, or trailers. Advanced features buffer 136 can be provided for implementing other advanced playback functions, including control of trick modes as described herein. Playback trick modes can include forward and reverse playback at speeds other than standard 1X playback speed.

The output processing section 170 can include an error correction block 130 and a track buffer or output buffer 172, in which data read from the disc can be buffered and assembled into packets for further processing. The packets can be processed by conditional access circuit 174 that controls propagation of the packets through demultiplexer 176 and into respective paths for video and audio processing. The video can be decoded by decoder 178, for example from MPEG-1 or MPEG-2 formats, and encoded by encoder 180 to a standardized television signal format such as ATSC, NTSC, SECAM or PAL. The audio can be decoded by decoder 182, for example from MPEG-1 or MPEG-2 or MP3 formats, and converted to analog form by audio digital-to-analog (D/A) converter 184. The audio D/A 184 can process digital audio received from the audio decoder 182 and produce an analog output signal.

Audio decoder 182 preferably includes a buffer for temporarily storing audio data prior to decoding. The operation of audio decoder 182 can be controlled via bus 181 by a processor such as control CPU 122. Digital audio from audio decoder 182 can be converted to analog form by a suitable digital to analog conversion device such as audio D/A 184.

Further, the determination of energy content per digital audio frame and the subsequent selection and removal of audio frames to create an audio signal corresponding to a desired trick mode playback speed as shall hereinafter be described can also be performed by control CPU 122. Communications between the audio decoder 182 and audio D/A 184 can be provided by a suitable system communication link such as system bus 181. System bus 181 can also be used to control the various operating parameters of audio decoder 182, and audio D/A 184. It should be recognized that a microcontroller or microprocessor independent of control CPU 122 can also be configured to determine the energy content per frame and to select and remove specified frames in order to create the trick mode playback audio signal. In this arrangement, the microcontroller or microprocessor can be connected to bus 181 and can receive audio frame content from audio decoder 182. The output audio signals from the microcontroller or microprocessor containing the processed audio frames can be input to the audio D/A 184 for conversion to baseband analog audio output signals.

For convenience, the invention shall be described relative to the architecture in FIG. 1. Notwithstanding, control CPU 122 can be configured to buffer a pre-specified number of audio frames. The buffers can be integrated within audio decoder 182 or separate audio buffers can be provided. Alternatively, in a case where a hard disk stores an MPEG video or MP3 audio presentation, the hard disk can act as the buffer and CPU 122 can determine the size of the audio content of a block of audio frames stored on the disk for examination. In any case, once the pre-specified number of audio frames has been buffered, CPU 122 can determine the energy content of at least a portion of the buffered audio frames.

Although the inventive speed up of replay audio has been described in terms of audible accompaniment matched in speed to a video trick mode playback, this advantageous arrangement is equally applicable to digital audio playback sources, such as personal audio players, answering and memo devices, with a hard disk or solid sate memory and employing digital encoding such as MP3. Digital audio playback devices can benefit from the inventive arrangements disclosed herein to facilitate reproduction of audio signals at rates higher than the original 1X recorded rate.

In a case where the input audio signal to the audio decoder 182 is a pulse code modulated (PCM) audio signal, time domain samples generally represent an instantaneous voltage analog of an acoustic sound pressure. Consequently, control CPU 122 can be configured to sum the absolute value of the magnitude of the instantaneous voltage values in order to determine the energy content of a frame. In a case where the input audio signal to audio decoder 182 is a compressed audio signal, the energy level of the frequency domain signals are typically represented in narrow band frequency groups called bins. For compressed audio, control CPU 122 can be configured to sum the magnitudes of signal components within the frequency bins to create a single value representing the average energy of the frequency components within a frame. Advantageously, since the audio portions that are of interest will fall within a given range of frequencies, the energy content can be determined by summing the magnitude of only those frequency components falling within a frequency range of interest. For example, extreme low and or high frequency components can be excluded from the energy determination. Notwithstanding, algorithms executable by control CPU 122 for determining the energy content of one or a plurality of audio frames are well known in the art.

Subsequent to determining the energy content of each of the pre-specified number of frames in the buffer, control CPU 122 can assign a number representing either the absolute, relative or average amount of energy contained within each frame within the buffer. Control CPU 122 can then rank the assigned absolute, relative or average energy value for each audio frame against the assigned absolute, relative or average energy values for all the other frames in the buffer. Control CPU 122 can discard frames with the least amount of energy until a frame count is achieved that substantially matches the audio to the video trick mode speed. Advantageously, the invention relies on mathematical algorithms to process audio frames, thereby resulting in increased speed and reduced hardware complexity. Notably, a microprocessor, for example and 8-bit microprocessor or microcontroller can be configured to process the audio frames. Importantly, there is no need to employ fast Fourier transform (FFT) and inverse FFT (IFFT) algorithms and/or circuitry to practice the invention, although interpretation of the claims are not limited in this respect.

Figure 2:
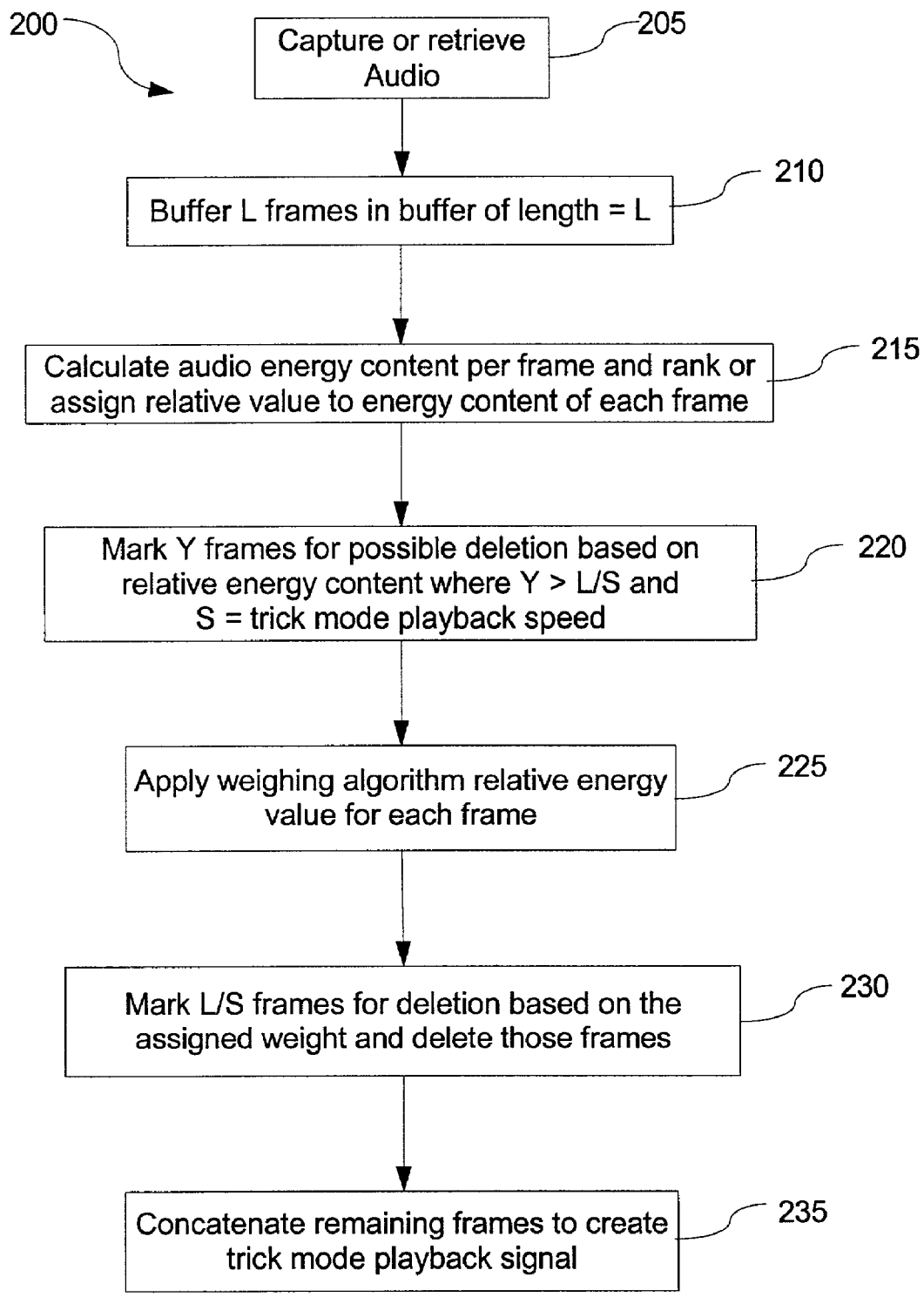
FIG. 2 is a flowchart that is useful for understanding the inventive arrangements as implemented in an exemplary media player such as the DVD device of FIG. 1.

FIG. 2 illustrates a flow chart showing exemplary steps in accordance with the inventive arrangements. Referring to FIG. 2, the audio portion of a video presentation can be captured or retrieved by audio decoder 182 in step 205. In step 210, Control CPU 122 can buffer a pre-specified number of frames L in a buffer. In step 215, the energy content of each of the L frames in the buffer can be determined by control CPU 122. Control CPU 122 can rank or assign a relative value to the energy content of each of the frames in the buffer. Without departing from the spirit of the invention, it should be recognized that audio energy can be calculated for only a portion of the frames in the buffer. Such energy summation over only a part of buffer content can be employed at higher trick play speeds. Similarly, only a portion of the L frames in the buffer can be ranked.

In step 220, the control CPU 122 can mark Y frames as deletion candidates, where Y is chosen so that slightly more frames than are needed to be deleted are selected as deletion candidates. Advantageously, this provides greater flexibility in deciding which frames will be deleted. For example, if the buffer length was 46 frames, and the required playback trick mode playback speed was 2X, then Y is chosen so that slightly more than 23 frames would be marked for deletion, since 50% or 1 out of every two frames are required to be deleted to achieve a trick mode playback speed of 2X. Hence, for example Y=28 (23+Δ) frames could be chosen for possible deletion.

Advantageously, a simple mathematical expression can be used to represent the number of possible frames to be deleted, thereby reducing computational complexity. For example, the expression Y=(L/S)+0.1L where Y=number of candidate deletion frames, S=trick mode playback speed used to determine the number of candidate deletion frames and L=the number of buffered audio frames. The decimal portion of Y can be rounded up or down to achieve a whole number of frames. It should be recognized that the factor 0.1L is arbitrarily chosen and is not intended as a limitation on the system. The criteria used to mark the frames for possible deletion can be based on those frames that have the least amount of energy. Thus in the example, the 28 frames having least audio energy can be marked for possible deletion.

Figures 3A, 3B, 3C, 3D, 3E:
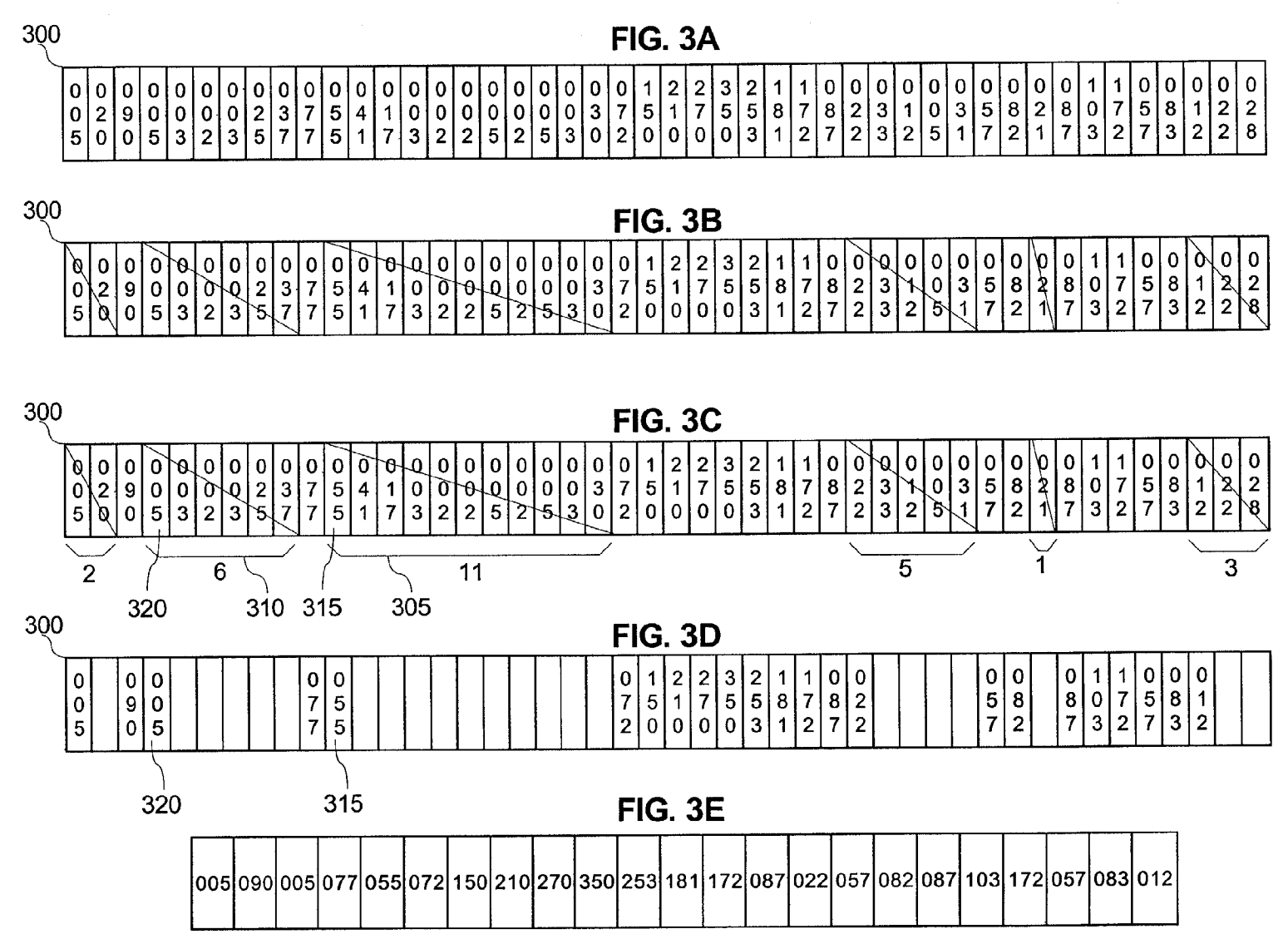

Subsequent to marking frames as candidates for deletion, a weighting algorithm can be applied to the relative value of energy determined for each frame in step 225. The weighting algorithm can, for example, consist of determining the size, or number of consecutive groups of frames that have been marked for possible deletion, as depicted in FIG. 3C. In step 230, candidate frames are marked for actual deletion and those frames are deleted. The criteria used to delete the frames can be based on the weight assigned to the group of frames in step 225. For example, the group of frames with the highest weight can be deleted first, the next highest second and so on until all the required candidate deletion frames have been deleted to achieve the required speed correspondence with the video trick mode. In general terms, steps 215 and 225 can be considered the ranking steps used in this embodiment, although the invention is not limited in this respect.

It is preferable to keep the first frame in every candidate deletion group in order to provide a gap or delineation between adjacent blocks of audio. This delineation can ensure relative silence or reduced audio content level with a duration of at least about 100 milliseconds, which through experimentation has been found to be preferable. The periods of relative silence or reduced audio content level can permit the listener to distinguish between separate blocks of speech. Longer silences can also be used, but it has been found that periods of relative silence longer than about 500 milliseconds are generally excessive and unnecessary. Subsequent to deleting frames in step 230, the remaining frames can be concatenated, as depicted in FIG. 3E, to create the trick mode audio playback signal in step 235.

FIG. 3A illustrates exemplary audio frames each of which shows an assigned relative value for energy content. Referring to FIG. 3A, which shows an exemplary buffer 300 of length L=46, containing 46 frames with each frame assigned a relative value. The exemplary required trick mode playback speed S is 2X. Hence, 50% or one out of every two frames have to be discarded to achieve an average playback speed of 2X.

FIG. 3B depicts exemplary audio frames in buffer 300 that have been marked, and shown with a diagonal line, as candidates for deletion. Referring to FIG. 3B, Y frames will be selected for possible deletion, where $Y=(L/S)+0.1L)$ Since L=46, and S=2, Y=28 frames (rounded up) will be marked for possible deletion. The candidate frames marked for deletion are the 28 frames with the lowest amount of audio energy identified by the relative value of their energy content.

FIG. 3C depicts exemplary weights that have been assigned to the groups of candidate frames in a buffer 300 marked for possible deletion. Referring to FIG. 3C, the weight can be assigned by selecting groups of consecutive frames from the candidate frames and assigning a weight equivalent to the number of consecutive frames in the group. For example, in FIG. 3C the largest group of consecutive frames marked for possible deletion is identified as 305 and contains 11 frames and is for example assigned a weight of 11. The next largest group of consecutive frames is identified as 310 which contains 6 frames and is assigned an exemplary weight of 6.

FIG. 3D depicts the remaining frames in buffer 300 following deletion of the marked deletion candidates. Referring to FIG. 3D, 23 frames are required to be deleted to achieve a trick mode playback speed of 2X. Starting with those groups of frames having the highest weight, frames are deleted accordingly until all 23 frames have been deleted. Preferably, in order to ensure sufficient delineation between successive blocks of audio, the first frame in every group of candidate frames is retained. For example, for frame group 305, the first frame 315 (see FIG. 3C) having a relative energy content value of 055 can be retained. Similarly, for frame group 310, the first frame 320 having a relative energy content value of 005 can be retained.

FIG. 3E depicts the concatenation of the audio frames remaining after the deletion of the various frames. Referring to FIG. 3E, after the 23 frames have been deleted, the remaining 23 frames can be concatenated to represent the 2X trick mode playback signal. The player 100 can generate the trick mode audio playback signal in audio digital to analog converter D/A 184 such that an audio signal is played back concurrently with, or at the same temporal program rate as the trick mode video.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could include a general purpose computer system with a computer program that, when being loaded and executed, controls the computer system and/or a DVD player, and/or a hard disk containing a MPEG video presentation, and/or other system similar to that shown in FIG. 1, such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form.

The description above is intended by way of example only and is not intended to limit the present invention in any way, except as set forth in the following claims.

What is claimed is:
1. A method for playing a digital audio recording at a speed other than 1X, the method comprising:
   retrieving stored digital audio information represented in a plurality of audio frames;
   ranking at least a portion of said plurality of audio frames according to an energy content of said portion of said audio frames;
   deleting from said portion of said plurality of audio frames having least energy content in accordance with said ranking step; and, selecting remaining ones of said portion of audio frames following said deleting step to form an audio trick mode playback signal.

2. The method according to claim 1, wherein said selecting step further comprises concatenating said remaining audio frames to form said audio trick mode playback signal.

3. The method according to claim 1, wherein said deleting step further comprises deleting from said portion of said plurality of audio frames a percentage of said plurality in accordance with a selected trick mode playback speed.

4. A method for playing audio programming accompanying a video presentation during trick mode playback at a speed other than 1X, the method comprising:
   retrieving information representing at least a video portion and a corresponding audio portion of said video presentation, said audio portion representing audio information in a plurality of audio frames;
   ranking at least a portion of said plurality of audio frames according to an energy content of said portion of said audio frames; and,
   selecting ones of said portion of audio frames based on said ranking step to form an audio trick mode playback signal.

5. The method according to claim 1, wherein said ranking step further comprises calculating said energy content of at least a portion of said plurality of audio frames.

6. The method according to claim 4, wherein said selecting step further comprises removing a portion of said plurality of audio frames in accordance with a selected video trick mode speed.

7. The method according to claim 5, wherein said selecting step further comprises removing said portion of said plurality of audio frames having least energy content in accordance with said calculating step.

8. The method according to claim 7, wherein said selecting step further comprises concatenating audio frames remaining having removed said audio frames having least energy content to form said trick mode playback signal.

9. The method according to claim 6, wherein said removing step further comprises increasing a size of said portion of audio frames to be removed to facilitate a faster video trick mode playback speed.

10. The method according to claim 5, wherein said calculating step further comprises summing magnitude values representing instantaneous voltage values for at least one audio frame.

11. The method according to claim 5, wherein said calculating step further comprises summing magnitudes of values in frequency bins within a frequency range for at least one audio frame.

12. An apparatus for playing audio programming associated with video programming during trick mode playback at other than 1X speed, comprising:
   a storage medium reader for retrieving from a storage medium information representing at least a video portion and a corresponding audio portion of a program, said audio portion representing audio information in a plurality of audio frames; and,
   an audio processor for ranking at least a portion of said plurality of audio frames according to an energy content of said portion of said audio frames, and forming an audio trick mode playback signal from selected ones of said portion of audio frames, in accordance with said ranking of said at least a portion of said audio frames.

13. The apparatus according to claim 12, wherein said audio processor comprising a calculating means for calculating said energy content of at least a portion of said plurality of audio frames.

14. The apparatus according to claim 13, wherein said audio processor further comprises means for selectively removing from said audio portion, a percentage portion of said plurality of audio frames in accordance with a selected video trick mode playback speed.

15. The apparatus according to claim 14, wherein said removing means for selectively removes from said plurality of audio frames said percentage portion of said plurality of audio frames having a least amount of said calculated energy content.

16. The apparatus according to claim 15, wherein said audio processor concatenates audio frames remaining after said removal of said percentage portion of said plurality of audio frames to form said trick mode playback signal audio trick mode playback signal.

17. The apparatus according to claim 14, wherein said removing means increases said percentage portion of audio frames to be removed to facilitate a faster trick mode playback speed.

18. The apparatus according to claim 13, wherein said calculating means calculates said energy content by determining a sum of absolute values of magnitudes of an instantaneous value representing the voltage for at least one audio frame.

19. The apparatus according to claim 13, wherein said calculating means calculates said energy content by determining a sum of magnitudes of values in frequency bins within a frequency range for at least one audio frame.

* * * * *